United States Patent
Akamine et al.

(10) Patent No.: US 9,415,383 B2
(45) Date of Patent: Aug. 16, 2016

(54) EXHAUST GAS PURIFICATION CATALYST

(75) Inventors: Masaaki Akamine, Hiroshima (JP); Masahiko Shigetsu, Higashi-Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 578 days.

(21) Appl. No.: 13/115,876

(22) Filed: May 25, 2011

(65) Prior Publication Data

US 2011/0301026 A1    Dec. 8, 2011

(30) Foreign Application Priority Data

Jun. 7, 2010   (JP) .................. 2010-130165

(51) Int. Cl.

| | |
|---|---|
| *B01J 23/10* | (2006.01) |
| *B01J 35/00* | (2006.01) |
| *B01D 53/94* | (2006.01) |
| *B01J 23/46* | (2006.01) |
| *B01J 23/63* | (2006.01) |
| *B01J 35/02* | (2006.01) |
| *B01J 37/03* | (2006.01) |
| *B01J 21/06* | (2006.01) |
| *B01J 21/04* | (2006.01) |

(52) U.S. Cl.
CPC ........... *B01J 35/0006* (2013.01); *B01D 53/945* (2013.01); *B01J 23/464* (2013.01); *B01J 23/63* (2013.01); *B01J 35/023* (2013.01); *B01J 37/038* (2013.01); *B01D 2255/1025* (2013.01); *B01D 2255/2063* (2013.01); *B01D 2255/2068* (2013.01); *B01D 2255/2092* (2013.01); *B01D 2255/20715* (2013.01); *B01D 2255/407* (2013.01); *B01D 2255/908* (2013.01); *B01D 2255/9202* (2013.01); *B01D 2258/012* (2013.01); *B01J 21/04* (2013.01); *B01J 21/066* (2013.01); *Y02T 10/22* (2013.01)

(58) Field of Classification Search
CPC ........... B01J 23/63; B01J 21/066; B01J 21/04
USPC .................. 502/304, 303, 349, 355
See application file for complete search history.

(56) References Cited

U.S. PATENT DOCUMENTS

| | | | |
|---|---|---|---|
| 6,413,904 | B1 | 7/2002 | Strehlau et al. |
| 7,341,975 | B2 | 3/2008 | Iwakund et al. |
| 2006/0276331 | A1 | 12/2006 | Akamine et al. |
| 2008/0026141 | A1 | 1/2008 | Pfeifer et al. |
| 2008/0139382 | A1 | 6/2008 | Morisaka et al. |
| 2008/0269046 | A1 | 10/2008 | Minoshima et al. |
| 2009/0107124 | A1 | 4/2009 | Yamada et al. |
| 2010/0146935 | A1* | 6/2010 | Chen et al. ............. 60/276 |
| 2011/0045968 | A1 | 2/2011 | Akamine et al. |

FOREIGN PATENT DOCUMENTS

| | | |
|---|---|---|
| CN | 1262144 A | 8/2000 |
| CN | 101157032 A | 4/2008 |
| JP | 2004-174490 A | 6/2004 |
| JP | 2006-334490 A | 12/2006 |
| WO | 2008/011146 A1 | 1/2008 |

* cited by examiner

*Primary Examiner* — Matthew E Hoban
*Assistant Examiner* — James Fiorito
(74) *Attorney, Agent, or Firm* — Studebaker & Brackett PC

(57) ABSTRACT

An exhaust gas purification catalyst includes a catalytic layer on a carrier, in which a particle component A and a particle component B are mixed. The particle component A is composed of catalytic-metal-doped CeZr-based mixed oxide powder, and has a particle size distribution with a peak in a particle size range of equal to or greater than 100 nm and equal to or less than 300 nm. A $CeO_2/(CeO_2+ZrO_2)$ mass ratio of CeZr-based mixed oxide is equal to or greater than 30% and equal to or less than 75%. The particle component B is composed of at least one selected from a group consisting of activated alumina powder, Zr-based-oxide-supported alumina powder, and catalytic-metal-undoped CeZr-based mixed oxide powder. At least a part of particles of the particle component B has a particle size larger than that of the particle component A.

5 Claims, 2 Drawing Sheets

EXHAUST GAS PURIFICATION CATALYST

CROSS-REFERENCE TO RELATED APPLICATION

This application claims priority to Japanese Patent Application No. 2010-130165 filed on Jun. 7, 2010, the disclosure of which including the specification, the drawings, and the claims is hereby incorporated by reference in its entirety.

BACKGROUND

The present disclosure relates to an exhaust gas purification catalyst.

The exhaust gas purification catalyst (three-way catalyst) purifying HC (hydrocarbon), CO (carbon monoxide), and NOx (nitrogen oxide) in engine exhaust gas generally contains, e.g., activated alumina and Ce-containing oxide in addition to catalytic metal such as Pt, Pd, and Rh. Since the activated alumina has high heat resistance and a large specific surface area, the activated alumina has been conventionally used as a support of the catalytic metal, and can maintain a state in which the catalytic metal is supported so as to be relatively highly dispersed even if the catalyst is exposed to high-temperature exhaust gas. The Ce-containing oxide stores and releases oxygen depending on fluctuation in oxygen concentration of exhaust gas, and therefore has been used as an oxygen storing/releasing material expanding an A/F window (an air-fuel ratio range in which the catalyst can simultaneously purify HC, CO, and NOx).

CeZr-based mixed oxide containing Ce and Zr has been known as the Ce-containing oxide. The CeZr-based mixed oxide has higher heat resistance as compared to that of ceria. In addition, since Zr dissolution causes crystal strain and an increase in an oxygen defect, an oxygen storing/releasing capacity comparable to that of ceria is provided. Further, CeZr-based mixed oxide has been known, in which rare-earth metal such as Nd, Y, and La is solid-dissolved.

The CeZr-based mixed oxide having a particle size (diameter) of about 1 μm has been generally used for the catalyst. The catalytic metal is physically supported on surfaces of CeZr-based mixed oxide particles by, e.g., evaporation to dryness or impregnation, thereby increasing an oxygen storing/releasing amount. This is because the catalytic metal is a medium accelerating the storage/release of oxygen by the CeZr-based mixed oxide. In such a case, the oxygen storing/releasing amount of the CeZr-based mixed oxide is also significantly low as compared to a theoretical value. This is because only surface portions of the particles having the particle size of about 1 μm are used for the oxygen storage.

As an oxygen storing/releasing material for which the foregoing point is improved, catalytic-metal-doped CeZr-based mixed oxide has been known, in which catalytic metal is solid-dissolved in CeZr-based mixed oxide (see Japanese Patent Publication No. 2004-174490). The term "doped" means that the catalytic metal is solid-dissolved in the mixed oxide, and is placed at crystal lattice points of the mixed oxide or between atoms of the mixed oxide. In the catalytic-metal-doped CeZr-based mixed oxide, the oxygen storing/releasing amount and an oxygen storing/releasing speed are dramatically improved as compared to those of CeZr-based mixed oxide which is not doped with the catalytic metal. This is because some of the catalytic metal particles are inside a mixed oxide particle, and accelerate movement of oxygen atoms inside the mixed oxide particle. That is, this is because not only the surface portion of the particle but also the inside of the particle are used for the storage/release of oxygen.

According to the catalytic-metal-doped mixed oxide, there are advantages that not only oxygen storing/releasing performance is improved, but also a catalytic metal amount of the catalyst can be significantly reduced. The catalytic-metal-doped CeZr-based mixed oxide is not limited to the use for the three-way catalyst, but can be used for, e.g., a lean NOx catalyst purifying NOx exhausted from a lean-combustion gasoline engine, and a PM (particulate matter) combustion catalyst efficiently oxidizing and combusting PMs trapped by a diesel particulate filter.

However, in the catalytic-metal-doped CeZr-based mixed oxide particles, all of the catalytic metal particles are not present on the particle surfaces, and a part of the catalytic metal particles is merely exposed on the particle surfaces. Thus, it is less likely that the catalytic metal and exhaust gas contact each other, and improvement of exhaust gas purification performance by doping the catalytic metal is limited.

On the other hand, the applicant of the present disclosure has proposed one solution in Japanese Patent Publication No. 2006-334490. In such a solution, the applicant has proposed that, on surfaces of first mixed oxide (CeZr-based mixed oxide) particles which are not doped with catalytic metal, second catalytic-metal-doped mixed oxide (CeZr-based mixed) particles having a particle size smaller than that of the first mixed oxide particle are supported. According to such a catalytic particle, a catalytic metal concentration on a catalytic particle surface is higher than that inside the catalytic particle, and therefore relatively high catalytic activity can be achieved even with a small catalytic metal amount.

SUMMARY

However, in the catalytic particle described in Japanese Patent Publication No. 2006-334490, there is a problem that the exhaust gas purification performance is likely to be degraded when the catalytic particles are exposed to high-temperature exhaust gas. One of causes of such degradation is that the catalytic-metal-doped CeZr-based mixed oxide particles having the small particle size are agglomerated on the surfaces of the first mixed oxide particles which are not doped with the catalytic metal and have the large particle size.

That is, the catalytic particles are obtained as follows: first mixed oxide powder is dispersed in a water solution in which each of nitrates of Ce, Zr, and the catalytic metal are dissolved; ammonia water is added to such a solution to deposit a precursor of the catalytic-metal-doped CeZr-based mixed oxide on the surfaces of the first mixed oxide particles; and then drying and calcining processes are performed. In such a fabrication method, the catalytic-metal-doped CeZr-based mixed oxide particles supported on the surfaces of the first mixed oxide particles are particulates having a significantly small particle size, e.g., a particle size of equal to or less than tens of nanometers, resulting in high surface energy. As a result, the catalytic-metal-doped CeZr-based mixed oxide particles on the surfaces of the first mixed oxide particles are agglomerated at high temperature, thereby degrading the catalytic activity.

The present disclosure relates to an exhaust gas purification catalyst using the catalytic-metal-doped CeZr-based mixed oxide, and it is an objective of the present disclosure to further improve the exhaust gas purification performance and reduce the degradation of the catalytic activity at high temperature.

In order to solve the foregoing problem, the present disclosure employs a configuration of the catalytic-metal-doped CeZr-based mixed oxide having a particle size distribution with a peak in a particle size range of equal to or greater than 100 nm and equal to or less than 300 nm, and a configuration in which catalytic-metal-doped CeZr-based mixed oxide powder and other catalytic powder having a large particle size are mixed in a catalytic layer.

An exhaust gas purification catalyst disclosed herein includes a catalytic layer containing a particle component A and a particle component B on a carrier.

The particle component A is composed of catalytic-metal-doped CeZr-based mixed oxide powder in which catalytic metal is solid-dissolved in CeZr-based mixed oxide.

The particle component B is composed of at least one selected from a group consisting of activated alumina powder, Zr-based-oxide-supported alumina powder in which Zr-based oxide is supported on activated alumina particles, and CeZr-based mixed oxide powder in which catalytic metal is not solid-dissolved.

The particle component A has a particle size distribution with a peak in a particle size range of equal to or greater than 100 nm and equal to or less than 300 nm, and has a $CeO_2$ amount of equal to or greater than 30% by mass and equal to or less than 75% by mass in a total amount of $CeO_2$ and $ZrO_2$. At least a part of particles of the particle component B has a particle size larger than that of the particle component A, and the particle components A and B are mixed in the catalytic layer.

The particle component A (catalytic-metal-doped CeZr-based mixed oxide powder) has the particle size distribution with the peak in the particle size range of equal to or greater than 100 nm and equal to or less than 300 nm. It means that the particle size of the particle component A is significantly small, i.e., a specific surface area of the particle component A is large. Thus, the particle component A exhibits excellent oxygen storing/releasing performance as compared to that of a conventional component having a particle size of about 1 μm. A small particle size means a large amount of catalytic metal exposed on a particle surface. Thus, more excellent oxygen storing/releasing performance of the particle component A is realized. In addition, since the catalytic metal is likely to contact exhaust gas, such a state is advantageous to purification of exhaust gas. As described in Japanese Patent Publication No. 2006-334490, surface energy is high for the submicroscopic catalytic-metal-doped CeZr-based mixed oxide particles supported on the second mixed oxide particles, and such particles are likely to be agglomerated. On the other hand, in a case where a component has a particle size distribution as in the particle component A, the surface energy is not excessively increased, and the particles are less agglomerated when the catalyst is exposed to high-temperature exhaust gas.

In the catalytic layer, the particle component A having the small particle size and the particle component B having the large particle size (at least one power type selected from the group consisting of activated alumina powder, Zr-based-oxide-supported alumina powder in which Zr-based oxide containing Zr is supported on activated alumina particles, and CeZr-based mixed oxide powder in which catalytic metal is not solid-dissolved) are mixed. It means a state in which small particles of the particle component A surround large particles of the particle component B, and at least a part of the particles of the particle component A is adhered to the particles of the particle component B. Thus, the large particles of the particle component B result in better dispersibility of the small particles of the particle component A, thereby enhancing the oxygen storing/releasing performance and catalytic activity. In addition, such a state is advantageous to reduction of the agglomeration when the catalyst is exposed to high-temperature exhaust gas.

Thus, according to the exhaust gas purification catalyst, excellent exhaust gas purification performance is realized, and degradation of catalytic performance when the catalyst is exposed to high-temperature exhaust gas is reduced.

It is preferable for the particle component B in an embodiment that a number-average particle size of the activated alumina powder is equal to or greater than 5 μm and equal to or less than 30 μm, a number-average particle size of the Zr-based-oxide-supported alumina powder is equal to or greater than 10 μm and equal to or less than 50 μm, and a number-average particle size of the CeZr-based mixed oxide powder in which the catalytic metal is not solid-dissolved is equal to or greater than 0.5 μm and equal to or less than 5.0 μm.

For the CeZr-based mixed oxide of the particle component A, the $CeO_2$ amount is equal to or greater than 30% by mass and equal to or less than 75% by mass in the total amount of $CeO_2$ and $ZrO_2$. Thus, the high exhaust gas purification performance can be realized. It is more preferable that the $CeO_2$ amount is equal to or greater than 40% by mass and equal to or less than 60% by mass.

As described above, the small catalytic-metal-doped particles of the particle component A surround the large particles of the particle component B, and at least a part of the particles of the particle component A is adhered to the particles of the particle component B. Thus, it is unnecessary that the catalytic metal is supported on the particle component B. That is, only the catalytic metal solid-dissolved in the CeZr-based mixed oxide particles of the particle component A suffices as the catalytic metal of the catalytic layer. Even if the catalytic metal is not supported on the particle component B, the high catalytic activity can be realized. Thus, a catalytic metal amount can be reduced without degrading the catalytic activity of the entire catalytic layer.

Since the particle component A has the particle size distribution with the peak in the particle size range of equal to or greater than 100 nm and equal to or less than 300 nm, the particle component A also functions as a binder for binding the large particles of the particle component B and binding the catalytic layer to the carrier. Thus, in the preferable embodiment, the particle component A forms at least a part of the binder in the catalytic layer.

It is preferable for the particle component A that a catalytic metal content (content of doped catalytic metal) is equal to or greater than about 0.1% by mass and equal to or less than about 1.0% by mass.

In the CeZr-based mixed oxide of the particle component A, rare-earth metal other than Ce can be solid-dissolved. Such rare-earth metal includes, e.g., Y, Nd, Pr, and La. In addition, the catalytic metal includes, e.g., Pd, Pt, Rh, In, Au, and Ag.

A structure may be employed, in which one or more catalytic layers in which catalytic metal such as Pt is supported on a support such as activated alumina are provided on the carrier in addition to the catalytic layer in which the particle components A and B are mixed, and the one or more catalytic layers and the catalytic layer are stacked.

DETAILED DESCRIPTION

Figure 1:
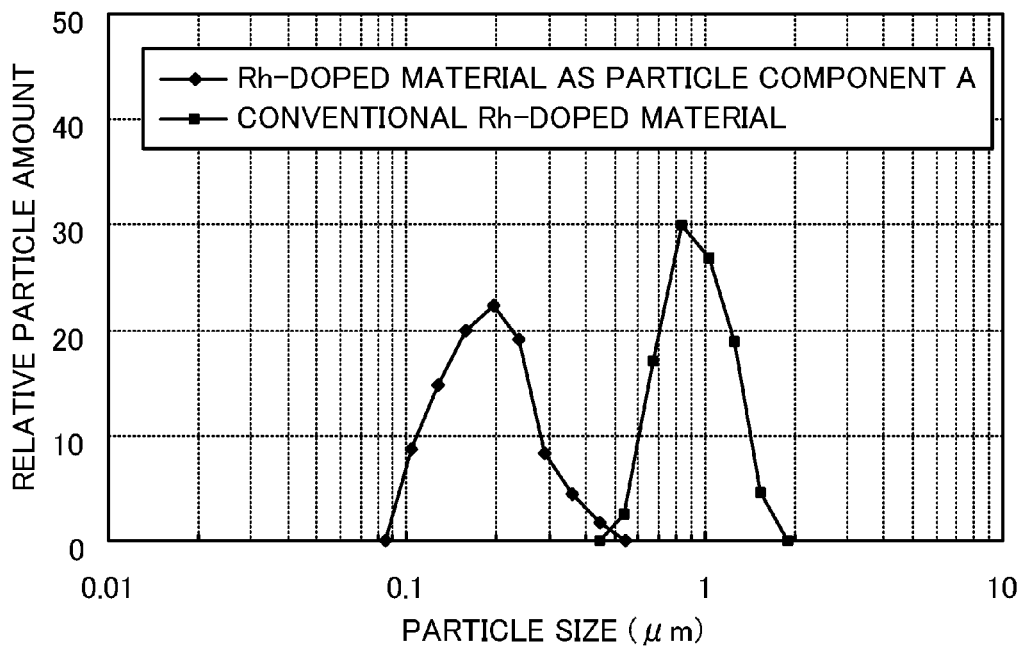
FIG. 1 is a graph illustrating a particle size distribution of Rh-doped material.

An embodiment of the present disclosure will be described below with reference to the drawings. The embodiment described below will be set forth merely for purposes of preferred examples in nature, and are not intended to limit applications or use of the invention.

An exhaust gas purification catalyst of the present embodiment is suitable for an application as a three-way catalyst simultaneously purifying HC, CO, and NOx contained in exhaust gas when a gasoline engine of an automobile is operated near a stoichiometric air-fuel ratio. In the exhaust gas purification catalyst, catalytic layers are formed on, e.g., cell walls of a honeycomb carrier made of cordierite (a heretofore known metal carrier may be used as the honeycomb carrier). The catalytic layer contains a particle component A and a particle component B. The particle component A is composed of catalytic-metal-doped CeZr-based mixed oxide powder in which catalytic metal is solid-dissolved in CeZr-based mixed oxide. The particle component B is composed of at least one selected from a group consisting of activated alumina powder, Zr-based-oxide-supported alumina powder in which Zr-based oxide is supported on activated alumina particles, and CeZr-based mixed oxide powder in which catalytic metal is not solid-dissolved.

The particle component A has a particle size distribution with a peak in a particle size range of equal to or greater than 100 nm and equal to or less than 300 nm, and a proportion of $CeO_2$ is equal to or greater than 30% by mass and equal to or less than 75% by mass in a total amount of $CeO_2$ and $ZrO_2$ of the CeZr-based mixed oxide. At least a part of particles of the particle component B has a particle size larger than that of particles of the particle component A. In the catalytic layer, the particle components A and B are mixed. The particle component A functions as a catalytic component, and also functions as a binder which is interposed between particles of the particle component B to bind such particles of the particle component B, and which enters many fine recessed portions or fine holes in a surface of the carrier to reduce or prevent peeling of the catalytic layer from the carrier.

Examples and comparative examples will be described below.

First Example

The present example is a case where a particle component A is Rh-doped CeZr-based mixed oxide powder, and a particle component B is Zr-based-oxide-supported alumina powder.

Preparation of Rh-Doped CeZr-Based Mixed Oxide Powder

Cerium nitrate hexahydrate, a zirconyl oxynitrate solution, neodymium nitrate hexahydrate, and a rhodium nitrate solution are dissolved in ion-exchanged water. Such a nitrate solution is mixed with an 8-fold diluted solution of 28-percent-by-mass ammonia water, and is neutralized, thereby obtaining a coprecipitate. After the coprecipitate is washed by centrifugal separation, the coprecipitate is dried in air at a temperature of 150° C. all night and all day, and is crushed. Then, the crushed coprecipitate is calcined in air at a temperature of 500° for two hours. This produces conventional Rh-doped CeZr-based mixed oxide powder having a particle size distribution with a peak in a particle size range larger than the particle size range of the particle component A. Such a particle size distribution will be described later. The "Rh-doped CeZr-based mixed oxide powder" will be referred to as "Rh-doped material" below as necessary.

The particle component A (Rh-doped material having a small peak particle size) is obtained by wet crushing of the conventional Rh-doped material. That is, ion-exchanged water is added to the conventional Rh-doped material to produce slurry (a solid content of 25% by mass). Then, the slurry is injected to a ball mill, and is crushed by 0.5-mm zirconia beads (for about three hours). This produces Rh-doped CeZrNd sol in which the particle component A having particles with a reduced size is dispersed.

FIG. 1 illustrates a particle size distribution (frequency distribution) of the particle component A (Rh-doped material having the small peak particle size) and the conventional Rh-doped material having a large peak particle size. In both of the Rh-doped materials, a composition (mass ratio) of components other than Rh is $CeO_2:ZrO_2:Nd_2O_3=45:45:10$, and an Rh content is about 0.6% by mass. A laser diffraction particle size analyzer manufactured by Shimadzu Corporation is used for a measurement of the particle size distribution.

The particle component A has a peak in a particle size range of equal to or greater than 100 nm and equal to or less than 300 nm, and the conventional Rh-doped material has a peak in a particle size range of equal to or greater than 550 nm and equal to or less than 1200 nm. For the particle component A, a cumulative 10 mass % diameter (D10) is 107 nm in a cumulative distribution, a cumulative 50 mass % diameter (D50) is 184 nm in the cumulative distribution, and a cumulative 90 mass % diameter (D90) is 287 nm in the cumulative distribution. That is, the cumulative 10 mass % diameter (D10) is equal to or greater than 100 nm in the cumulative distribution, and the cumulative 90 mass % diameter (D90) is equal to or less than 300 nm in the cumulative distribution. For the conventional Rh-doped material, the cumulative 10 mass % diameter (D10) is 576 nm in the cumulative distribution, the cumulative 50 mass % diameter (D50) is 848 nm in the cumulative distribution, and the cumulative 90 mass % diameter (D90) is 1160 nm in the cumulative distribution. That is, the cumulative 10 mass % diameter (D10) is equal to or greater than 550 nm in the cumulative distribution, and the cumulative 90 mass % diameter (D90) is equal to or less than 1200 nm in the cumulative distribution.

Preparation of Catalyst

As the sol of the particle component A, six types of sol having different $CeO_2/(CeO_2+ZrO_2)$ mass ratios of Rh-doped CeZr-based mixed oxide (six types of sol having the mass ratios of 25%, 30%, 40%, 50%, 60%, and 75%) were prepared by the foregoing preparation method. In any of the six types of sol, a composition (mass ratio) of components other than Rh is $(CeO_2+ZrO_2):Nd_2O_3=90:10$, and an Rh content is 0.6% by mass. As the particle component B, Zr-based-oxide-supported alumina powder ($ZrLa/Al_2O_3$) having a number-average particle size of 33 μm was employed.

$ZrLa/Al_2O_3$ was formed so that ZrLa mixed oxide containing Zr and La is supported on surfaces of activated alumina particles, and was prepared as follows. That is, activated alumina powder is dispersed in a mixture of zirconium nitrate and lanthanum nitrate, and ammonia water is added to the resultant mixture to produce precipitate. The produced precipitate is filtered, washed, dried at 200° C. for two hours, and calcined at 500° C. for two hours, thereby obtaining $ZrLa/Al_2O_3$. A composition (mass ratio) of $ZrLa/Al_2O_3$ is $ZrO_2:La_2O_3:Al_2O_3=38:2:60$.

Each of the six types of sol of the particle component A, the particle component B ($ZrLa/Al_2O_3$), and a zirconyl nitrate binder were mixed with ion-exchanged water to produce slurry. The carrier was coated with the slurry, and the drying and calcining processes were performed. Then, six types of exhaust gas purification catalysts (A sol/(ZrLa/Al$_2$O$_3$)) of the first example were obtained. In catalytic layers of the catalysts, the particle component A which is a catalytic component also functions as a binder.

An amount of each supported component per a carrier capacity of 1 L is 6.7 g/L for the particle component A, 70 g/L for the particle component B, and 8 g/L for the binder. A Rh content in the catalytic layer is 0.04 g/L (=an amount of doped Rh in the particle component A). As the carrier, a honeycomb carrier (the capacity of 1 L) made of cordierite is used, and has a cell wall thickness of 3.5 mil (8.89×10$^{-2}$ mm) and the cell number of 600 per square inch (645.16 mm$^2$) The same carrier is employed in other examples and comparative examples which will be described later.

Second Example

In the present example, catalytic-metal-undoped CeZr-based mixed oxide powder (CeZrNdO) having a number-average particle size of 2.5 μm, in which catalytic metal is not solid-dissolved was employed instead of the ZrLa/Al$_2$O$_3$. The CeZrNdO was prepared in the similar manner to the preparation method of the conventional Rh-doped material, except that a rhodium nitrate solution is not added to a raw material solution. A composition (mass ratio) of the CeZrNdO is CeO$_2$:ZrO$_2$:Nd$_2$O$_3$=23:67:10.

Then, each of six types of a particle component A (sol) same as those of the first example, and CeZrNdO which is a particle component B were used, and six types of exhaust gas purification catalysts (A sol/CeZrNdO) of the second example was obtained in the same manner as that of the first example. As in the first example, an amount of each supported component is 6.7 g/L for the particle component A, 70 g/L for the particle component B, and 8 g/L for a binder. A Rh content in a catalytic layer is 0.04 g/L (=an amount of doped Rh in the particle component A).

Third Example

In the present example, activated alumina powder (La—Al$_2$O$_3$) containing La$_2$O$_3$ of 4% by mass and having a number-average particle size of 13.8 μm was employed as a particle component B instead of the ZrLa/Al$_2$O$_3$. That is, each of six types of a particle component A (sol) same as those of the first example, and the La—Al$_2$O$_3$ which is the particle component B were used, and six types of exhaust gas purification catalysts (A sol/La—Al$_2$O$_3$) of the third example were obtained in the same manner as that of the first example. As in the first example, an amount of each supported component is 6.7 g/L for the particle component A, 70 g/L for the particle component B, and 8 g/L for a binder. A Rh content in a catalytic layer is 0.04 g/L (=an amount of doped Rh in the particle component A).

Fourth Example

In the present example, a mixture of three types of powder, i.e., activated alumina powder (La—Al$_2$O$_3$), Zr-based-oxide-supported alumina powder (ZrLa/Al$_2$O$_3$), and catalytic-metal-undoped CeZr-based mixed oxide powder (CeZrNdO) was employed as a particle component B. That is, the particle component A (sol) of the first example in which the CeO$_2$/(CeO$_2$+ZrO$_2$) mass ratio is 50%, and the triple powder mixture which is the particle component B were used. Then, an exhaust gas purification catalyst (A sol/the triple powder mixture) of the fourth example was obtained in the same manner as that of the first example. As in the first example, an amount of each supported component is 6.7 g/L for the particle component A, 70 g/L for the particle component B, and 8 g/L for a binder. A Rh content in a catalytic layer is 0.04 g/L (=an amount of doped Rh in the particle component A). A ratio (mass ratio) of the triple powder mixture forming the particle component B is 1:1:1.

First Comparative Example

In the present comparative example, the conventional Rh-doped material having the large peak particle size was employed as a particle component A instead of the Rh-doped material having the small peak particle size. As in the first example, Zr-based-oxide-supported alumina powder (ZrLa/Al$_2$O$_3$) was employed as a particle component B.

That is, the conventional Rh-doped material having a CeO$_2$/(CeO$_2$+ZrO$_2$) mass ratio of 50% was prepared. Then, such Rh-doped material, the particle component B (ZrLa/Al$_2$O$_3$), and a zirconyl nitrate binder were mixed with ion-exchanged water to produce slurry. A carrier was coated with the slurry, and the drying and calcining processes were performed. Then, an exhaust gas purification catalyst (the conventional Rh-doped material/(ZrLa/Al$_2$O$_3$)) of the first comparative example was obtained. An amount of each supported component per a carrier capacity of 1 L is 6.7 g/L for the conventional Rh-doped material, 70 g/L for the particle component B, and 8 g/L for a binder. A Rh content in a catalytic layer is 0.04 g/L (=an amount of doped Rh in the conventional Rh-doped material).

Second Comparative Example

In the present comparative example, an exhaust gas purification catalyst (the conventional Rh-doped material/CeZrNdO) of the second comparative example was obtained in the similar manner to that of the first comparative example, except that catalytic-metal-undoped CeZr-based mixed oxide powder (CeZrNdO) was employed as a particle component B as in the second example. As in the first comparative example, an amount of each supported component is 6.7 g/L for the conventional Rh-doped material, 70 g/L for the particle component B, and 8 g/L for a binder. A Rh content in a catalytic layer is 0.04 g/L (=an amount of doped Rh in the conventional Rh-doped material).

Third Comparative Example

In the present comparative example, an exhaust gas purification catalyst (the conventional Rh-doped material/La—Al$_2$O$_3$) of the third comparative example was obtained in the similar manner to that of the first comparative example, except that activated alumina powder (La—Al$_2$O$_3$) was employed as a particle component B as in the third example. As in the first comparative example, an amount of each supported component is 6.7 g/L for the conventional Rh-doped material, 70 g/L for the particle component B, and 8 g/L for a binder. A Rh content in a catalytic layer is 0.04 g/L (=an amount of doped Rh in the conventional Rh-doped material).

Fourth Comparative Example

In the present comparative example, an exhaust gas purification catalyst (the conventional Rh-doped material/the triple powder mixture) of the fourth comparative example was obtained in the similar manner to that of the first comparative example, except that a mixture of three types of powder, i.e., activated alumina powder (La—$Al_2O_3$), Zr-based-oxide-supported alumina powder (ZrLa/$Al_2O_3$), and catalytic-metal-undoped CeZr-based mixed oxide powder (CeZrNdO) was employed as a particle component B as in the fourth example. As in the first comparative example, an amount of each supported component is 6.7 g/L for the conventional Rh-doped material, 70 g/L for the particle component B, and 8 g/L for a binder. A Rh content in a catalytic layer is 0.04 g/L (=an amount of doped Rh in the conventional Rh-doped material).

<Exhaust Gas Purification Performance>

Bench aging was applied to each of the catalysts of the first to fourth examples and the first to fourth comparative examples. In such a process, the catalyst was attached to an engine exhaust system. Then, the engine was operated while repeating a cycle including the following steps for 50 hours in total at a catalyst inlet gas temperature of 900° C.: (1) causing a flow of exhaust gas having an A/F ratio of 14 for 1 minute; (2) causing a flow of exhaust gas having an A/F ratio of 13.5 for 1 minute; and (3) causing a flow of exhaust gas having an A/F ratio of 14.7 for 2 minutes.

Subsequently, a core sample having a carrier capacity of about 25 mL (a diameter of 25.4 mm and a length of 50 mm) was cut out from each of the catalysts, and was attached to a model gas flow reactor. Then, a light-off temperature T50 (° C.) concerning HC purification was measured. The "T50 (° C.)" is a gas temperature at an catalyst inlet when purification efficiency reaches 50% by gradually increasing a temperature of model gas flowing into the catalyst from a normal temperature. The model gas has an A/F ratio of 14.7±0.9. That is, by causing a constant flow of main stream gas having an A/F ratio of 14.7, and adding a predetermined amount of gas for changing the A/F ratio in a pulse-like manner at a period of 1 Hz, the A/F ratio was forcibly changed with an amplitude of ±0.9. A space velocity SV is 60000 $h^{-1}$, and a rate of temperature increase is 30° C./min Table 1 shows gas compositions having A/F ratios of 14.7, 13.8, and 15.6, and FIG. 2 shows measurement results of the light-off temperature T50.

TABLE 1

| A/F | 13.8 | 14.7 | 15.6 |
|---|---|---|---|
| $C_3H_6$ (ppm) | 541 | 555 | 548 |
| CO (%) | 2.35 | 0.60 | 0.59 |
| NO (ppm) | 975 | 1000 | 980 |
| $CO_2$ (%) | 13.55 | 13.90 | 13.73 |
| $H_2$ (%) | 0.85 | 0.20 | 0.20 |
| $O_2$ (%) | 0.58 | 0.60 | 1.85 |
| $H_2O$ (%) | 10 | 10 | 10 |

Figure 2:
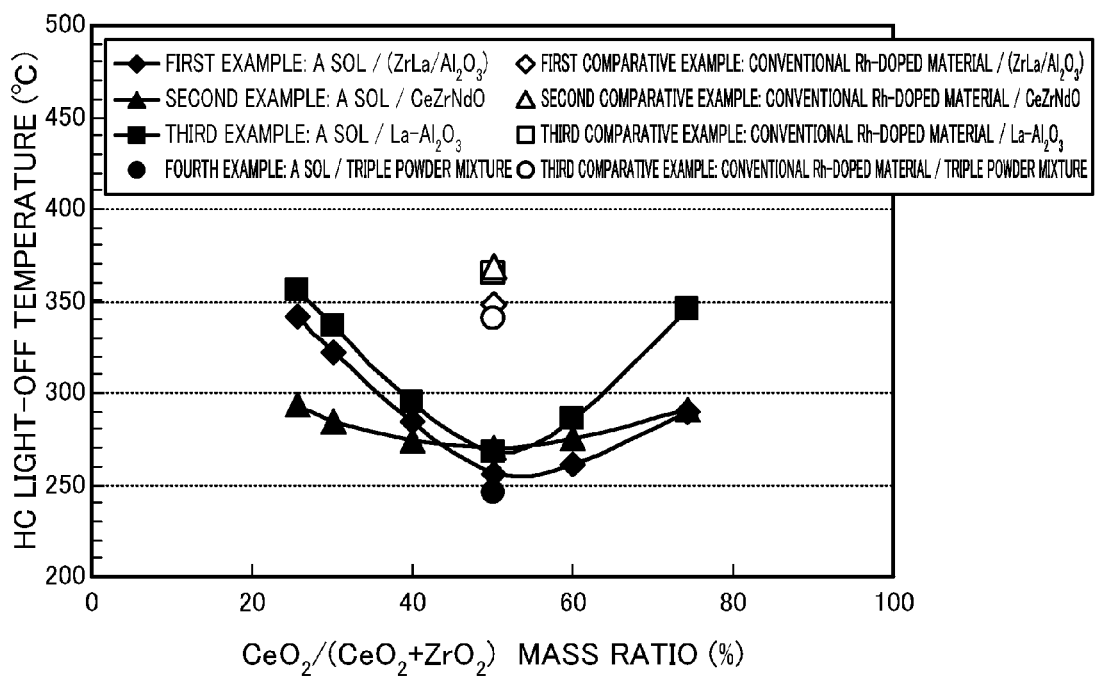
FIG. 2 is a graph illustrating a light-off temperature concerning HC purification in examples and comparative examples.

According to FIG. 2, in the first to fourth examples, when a $CeO_2/(CeO_2+ZrO_2)$ mass ratio is 50%, a light-off temperature is lower as compared to that when the $CeO_2/(CeO_2+ZrO_2)$ mass ratio is 50% in the first to fourth comparative examples. This is because of the following reasons: a particle component A (the Rh-doped material having the small peak particle size) has excellent oxygen storing/releasing performance as compared to that of the conventional Rh-doped material having the large peak particle size; wide and uniform dispersion of the particle component A having a small particle size in a catalytic layer, and high dispersibility of a part of particles of the particle component A adhered to a particle component B having a large particle size result in that the particle component A is likely to contact exhaust gas; and sintering is not likely to occur.

Regarding an influence of a difference in the $CeO_2/(CeO_2+ZrO_2)$ mass ratio on catalytic performance, the light-off temperature is the lowest when the $CeO_2/(CeO_2+ZrO_2)$ mass ratio is 50%, and good exhaust gas purification performance can be obtained when the mass ratio is equal to or greater than 30% and equal to or less than 75%, and, in particular, equal to or greater than 40% and equal to less than 60%.

Samples of the four catalyst types of the first to fourth examples for a $CeO_2/(CeO_2+ZrO_2)$ mass ratio of 50% in FIG. 2 were produced, in which a $ZrO_2$ binder is not mixed. Although results are not shown in the figure, an about-five-degree reduction in light-off temperature was recognized in any of the samples. Since the particle component A of the present disclosure has the binder function, a binder such as $ZrO_2$, $Al_2O_3$, and $SiO_2$ is not necessarily mixed.

Figure 3:
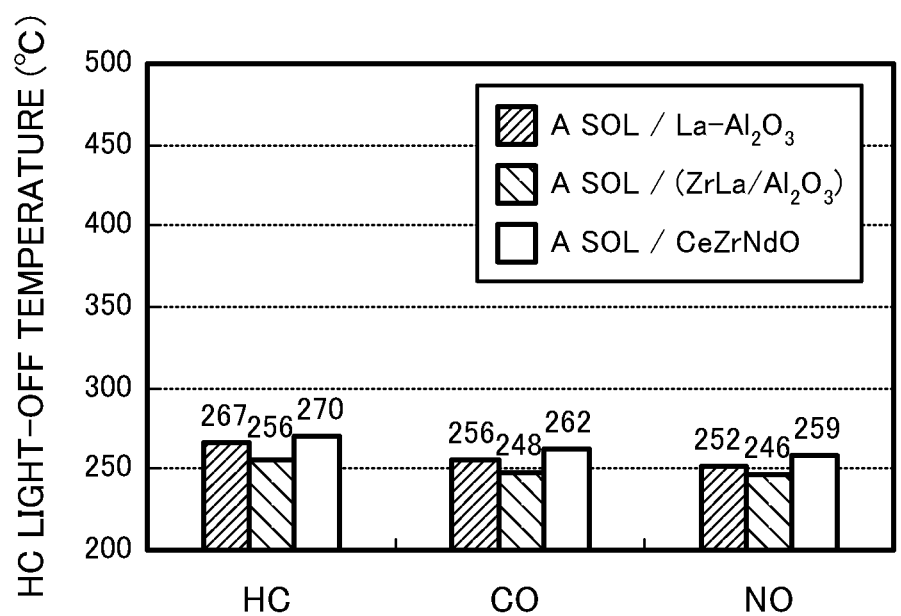
FIG. 3 is a graph illustrating a light-off temperature concerning purification of HC, CO, and NOx when a $CeO_2/(CeO_2+ZrO_2)$ mass ratio in the examples is 50%.

FIG. 3 shows a light-off temperature concerning purification of HC, CO, and NOx in the first to third examples when a $CeO_2/(CeO_2+ZrO_2)$ mass ratio is 50%. Conditions for measurement of the light-off temperature are the same as those of the case of FIG. 2. According to FIG. 3, as a particle component B combined with a particle component A (the Rh-doped material having the small peak particle size), Zr-based-oxide-supported alumina powder (ZrLa/$Al_2O_3$) is the most preferable, activated alumina powder (La—$Al_2O_3$) is the second most preferable, and catalytic-metal-undoped CeZr-based mixed oxide powder (CeZrNdO) is the third most preferable.

What is claimed is:

1. An exhaust gas purification catalyst, comprising:
   a catalytic layer containing a particle component A and a particle component B on a carrier,
   wherein the particle component A is composed of catalytic-metal-doped CeZr-based mixed oxide powder in which catalytic metal is solid-dissolved in CeZr-based mixed oxide,
   the particle component B is composed of activated alumina powder, which has a number-average particle size of equal to or greater than 5 μm and equal to or less than 30 μm,
   Zr—La mixed oxide-supported alumina powder in which Zr—La mixed oxide is supported on activated alumina particles, which has a number-average particle size of equal to or greater than 10 μm and equal to or less than 50 μm, and
   CeZr-based mixed oxide powder in which catalytic metal is not solid-dissolved, which has a number-average particle size of equal to or greater than 0.5 μm and equal to or less than 5.0 μm,
   the particle component A has a particle size distribution with a peak in a particle size range of equal to or greater than 100 nm and equal to or less than 300 nm, and has a $CeO_2$ amount of equal to or greater than 30% by mass and equal to or less than 75% by mass in a total amount of $CeO_2$ and $ZrO_2$, and
   the particle components A and B are mixed such that the particle component A is at least partially interposed between particles of the particle component B in the catalytic layer.

2. The exhaust gas purification catalyst of claim 1, wherein the $CeO_2$ amount is equal to or greater than 40% by mass and equal to or less than 60% by mass.

3. The exhaust gas purification catalyst of claim 1, wherein only catalytic metal solid-dissolved in the CeZr-based mixed oxide of the particle component A is contained in the catalytic layer as catalytic metal.

4. The exhaust gas purification catalyst of claim 2, wherein only catalytic metal solid-dissolved in the CeZr-based mixed oxide of the particle component A is contained in the catalytic layer as catalytic metal.

5. The exhaust gas purification catalyst of claim 1, wherein the particle component A is contained in the catalytic layer as a binder for binding particles of the particle component B and binding the catalytic layer to the carrier.

* * * * *